United States Patent [19]

Nelson et al.

[11] Patent Number: 4,525,544

[45] Date of Patent: Jun. 25, 1985

[54] VINYL ESTER RESIN COMPOSITION

[75] Inventors: Donald L. Nelson; Mary H. Lamont, both of Lake Jackson, Tex.

[73] Assignee: The Dow Chemical Company, Midland, Mich.

[21] Appl. No.: 367,643

[22] Filed: Apr. 12, 1982

[51] Int. Cl.$^3$ .................. C08F 283/10; C08G 59/16
[52] U.S. Cl. ................... 525/531; 525/530
[58] Field of Search ................ 525/530, 531

[56] References Cited

U.S. PATENT DOCUMENTS

| | | | |
|---|---|---|---|
| Re. 30,583 | 4/1981 | Nelson | 525/531 |
| 3,632,861 | 1/1972 | Hargis, Jr. | 260/837 R |
| 3,793,285 | 2/1974 | Koss | 525/530 |
| 4,148,765 | 4/1979 | Nelson | 525/7 |
| 4,167,542 | 9/1979 | Nelson | 525/445 |
| 4,310,647 | 1/1982 | Zacharias | 525/530 |

FOREIGN PATENT DOCUMENTS 20637  6/1973  Japan .................. 525/530

*Primary Examiner*—John C. Bleutge
*Assistant Examiner*—Robert E. L. Sellers, II
*Attorney, Agent, or Firm*—J. G. Carter

[57] ABSTRACT

Vinyl ester resins are prepared from epoxy resins and an adduct of (1) alpha, beta ethylenically unsaturated acids or anhydrides containing 4 or 5 carbon atoms; (2) an unsaturated hydrocarbon selected from dimers, codimers, oligomers and cooligomers of dienes containing 4 to 6 carbon atoms; (3) if component (1) is an anhydride, water, and optionally; (4) isomerization catalysts or reactants that cause isomerization; (5) monofunctional acids selected from acrylic acid or methacrylic acid; and (6) alpha, beta ethylenically unsaturated anhydrides containing 4 or 5 carbon atoms.

30 Claims, No Drawings

VINYL ESTER RESIN COMPOSITION

BACKGROUND OF THE INVENTION

The present invention concerns novel vinyl ester resins prepared from epoxy resins and hydrocarbon adducts of maleic acid, fumaric acid, itaconic acid or citraconic acid.

Vinyl ester resins are thermosettable resins prepared by reacting an epoxy resin with an unsaturated monocarboxylic acid or partial esters prepared from hydroxyalkyl esters of unsaturated monocarboxylic acids and dicarboxylic acids. Such vinyl ester resins have been disclosed in U.S. Pat. Nos. 3,066,122 issued to Brinker et al.; 3,179,623 issued to Bowen; 3,256,226 issued to Fekete et al.; 3,301,743 issued to Fekete et al.; 3,337,406 issued to DeMarco et al. and 3,367,992 issued to Bearden. Such vinyl ester resins are employed alone or blended with ethylenically unsaturated reactive diluents such as styrene, vinyl toluene, methyl methacrylate, ethyl acrylate and the like. Even more recently, as described by Nelson in U.S. Pat. No. Re. 30,583, less expensive reactive diluents such as dicyclopentadiene alkenoates have been employed.

The present invention provides for the incorporation of less expensive hydrocarbons into the vinyl ester resin.

SUMMARY OF THE PRESENT INVENTION

One aspect of the present invention concerns novel vinyl ester resins obtained by reacting (A) at least one epoxy resin having an average of more than one glycidyl ether group per molecule;

(B) a product resulting from a reaction product of
  (1) the reaction product of
    (a) at least one $\alpha,\beta$-ethylenically unsaturated acid containing 4 or 5 carbon atoms per molecule, anhydrides thereof, isomers thereof or mixtures thereof;
    (b) at least one unsaturated hydrocarbon selected from
      (i) dienes having from about 9 to about 12 carbon atoms;
      (ii) oligomers or cooligomers of dienes having from 4 to 6 carbon atoms optionally containing minor amounts of mono-olefins having from about 4 to about 6 carbon atoms; or
      (iii) mixtures thereof; and
    (c) if (B-1-a) contains an anhydride, from about 0.4 to about 3, preferably from about 0.8 to about 1.1, moles of water per mole of anhydride; with
  (2) a vicinal monoepoxide; and optionally
  (3) up to about 10 percent, preferably from about 0.5 percent to about 7 percent, by weight of the combined weight of (B-1) and (B-2) of a suitable isomerization catalyst for component (B-1-a); optionally (C) up to about 0.75 mole per epoxy equivalent contained in components (A) of a polymerizable ethylenically unsaturated monocarboxylic acid; and optionally (D) up to about 0.4 moles per epoxy equivalent contained in component (A) of maleic anhydride, citraconic anhydride or mixtures thereof; and wherein components (A) and (B) are present in an amount which provides an epoxy equivalent to carboxyl equivalent ratio of from about 0.8:1 to about 2:1, preferably from about 0.95:1 to about 1.05:1; components (B-2) and (B-1-a) are employed in an amount which provides from about 0.01 to about 0.6, preferably from about 0.1 to about 0.5, moles of vicinal monoepoxide per mole of acid and/or anhydride; and component (B-1-b) is employed in an amount which provides from about 0.4 to about 1.5, preferably from about 0.7 to about 1.1, moles per mole of component (B-1-a).

Another aspect of the present invention is a thermosettable composition which comprises (I) from about 25 to about 90, preferably from about 50 to about 65, weight percent of one or more vinyl ester resins or mixture of such vinyl ester resins with one or more unsaturated polyester resins wherein at least about 25 weight percent thereof is a vinyl ester resin which has been prepared by reacting (A) at least one epoxy resin having an average of more than one glycidyl ether group per molecule; and (B) a product resulting from a reaction product of
  (1) the reaction product of
    (a) at least one $\alpha,\beta$-ethylenically unsaturated acid containing 4 or 5 carbon atoms per molecule, anhydrides thereof, isomers thereof or mixtures thereof;
    (b) at least one unsaturated hydrocarbon selected from
      (i) dienes having from about 9 to about 12 carbon atoms;
      (ii) oligomers or cooligomers of dienes having from 4 to 6 carbon atoms optionally containing minor amounts of mono-olefins having from about 4 to about 6 carbon atoms; or
      (iii) mixtures thereof; and
    (c) if (B-1-a) contains an anhydride, from about 0.4 to about 3, preferably from about 0.8 to about 1.1, moles of water per mole of anhydride; with
  (2) a vicinal monoepoxide; and optionally
  (3) up to about 10 percent, preferably from about 0.5 percent to about 7 percent, by weight of the combined weight of (B-1) and (B-2) of a suitable isomerization catalyst for component (B-1-a); optionally (C) up to about 0.75 mole per epoxy equivalent contained in components (A) of a polymerizable ethylenically unsaturated monocarboxylic acid; and optionally (D) up to about 0.4 moles per epoxy equivalent contained in component (A) of maleic anhydride, citraconic anhydride or mixtures thereof; and (II) from about 0 to about 75, preferably from about 35 to about 50, percent by weight of at least one polymerizable ethylenically unsaturated monomer; and wherein components (A) and (B) are present in an amount which provides an epoxy equivalent to carboxyl equivalent ratio of from about 0.8:1 to about 2:1, preferably from about 0.95:1 to about 1.05:1; components (B-2) and (B-1-a) are employed in an amount which provides from about 0.01 to about 0.6, preferably from about 0.1 to about 0.5, moles of vicinal monoepoxide per mole of acid and/or anhydride; and component (B-1-b) is employed in an amount which provides from about 0.4 to about 1.5, preferably from about 0.7 to about 1.1, moles per mole of component (B-1-a).

DETAILED DESCRIPTION OF THE INVENTION

Suitable epoxy resins which can be employed herein to prepare the novel vinyl ester resins of the present invention include those described in U.S. Pat. Nos. 3,066,122 issued to Brinker, et al.; 3,179,623 issued to Bowen; 3,256,226 issued to Fekete et al.; 3,301,743 issued to Fekete et al.; 3,337,406 issued to DeMarco et al.; 3,367,992 issued to Bearden; and 3,564,074 issued to Swisher et al. which are incorporated herein by reference. Particularly suitable epoxy resins include the glycidyl ethers of bisphenols and the glycidyl ethers of phenol-formaldehyde epoxy resins.

Suitable unsaturated hydrocarbons which can be employed herein include dicyclopentadiene or codimers of cyclopentadiene and other $C_4$–$C_6$ unsaturated hydrocarbons such as butadiene, isoprene, piperylene and methyl cyclopentadiene, mixtures thereof and the like. Also suitable unsaturated hydrocarbons include oligomers and cooligomers of the aforementioned unsaturated hydrocarbons which can be employed herein include, for example, a dicyclopentadiene stream containing about 94% to 100% dicyclopentadiene, zero to 6% codimers of cyclopentadiene or methyl cyclopentadiene with other $C_4$–$C_6$ olefins and zero to 2% other aliphatic saturated and unsaturated hydrocarbons. Also, particularly suitable unsaturated hydrocarbons include, for example, a dicyclopentadiene concentrate containing from about 70 to about 94 percent by weight dicyclopentadiene, from about 6% to about 30% by weight dimers and codimers of $C_4$–$C_6$ hydrocarbons, from about zero to about 7 percent by weight of $C_{14}$ to $C_{18}$ trimers of $C_4$–$C_6$ hydrocarbons and about zero to about 7 percent by weight of other aliphatic and cycloaliphatic saturated and unsaturated hydrocarbons. Method of preparation for these dicyclopentadiene concentrates and more detailed descriptions thereof can be found collectively in U.S. Pat. Nos. 3,557,239 issued to Gebhard et al. and 4,167,542 issued to Nelson, both of which are incorporated herein by reference.

Suitable vinyl ester resins which may be employed herein together with the novel vinyl ester resins of the present invention in forming the novel thermosettable resin compositions of the present invention include those vinyl ester resins prepared in the aforementioned U.S. Pat. Nos. 3,066,122 issued to Brinker et al.; 3,179,623 issued to Bowen; 3,256,226 issued to Fekete et al.; 3,301,743 issued to Fekete et al.; 3,337,406 issued to DeMarco et al.; 3,367,992 issued to Bearden; and 3,564,074 issued to Swisher et al. which have been incorporated herein by reference.

Suitable polymerizable ethylenically unsaturated monomers which can be employed herein include those described in the aforementioned U.S. patents as well as the dicyclopentadiene alkenoates described by Nelson in U.S. Pat. No. 4,167,542, which also is incorporated herein by reference, which employs among other hydrocarbons, a dimerized C-5 stream described in U.S. Pat. No. 3,557,239 issued to Gebhart et al. which is incorporated herein by reference.

Suitable vicinal monoepoxides which can be employed herein include alkylene oxides having from 2 to 4 carbon atoms, halogen substituted alkylene oxides and monoglycidyl ethers of alcohols having from 2 to about 14 carbon atoms. Particularly suitable alkylene oxides include, for example, ethylene oxide, propylene oxide, 1,2-butylene oxide, 2,3-butylene oxide, mixtures thereof and the like. Particularly suitable halogen substituted alkylene oxides include, for example, epichlorohydrin, epibromohydrin, epiiodohydrin, methylepichlorohydrin, mixtures thereof and the like.

The isomerization reaction is conducted in the presence of a suitable catalyst by the method described by S. R. Hargis, Jr. in U.S. Pat. No. 3,632,861 which is incorporated herein by reference. Particularly suitable catalysts include hydrogen halides, either anhydrous or aqueous, chlorine, bromine, iodine, morpholine or derivatives thereof and piperazine or derivatives thereof. The isomerization reaction is conveniently conducted at a temperature of from about 80° C. to about 120° C., preferably from about 100° C. to about 120° C., for a time sufficient to reach the desired isomerization.

The reaction between the acid and vicinal monoepoxide can be conducted in the presence of either an acidic or basic catalyst such as, for example, sodium hydroxide, potassium hydroxide, lithium chloride, organic amine salts and hydroxides, tertiary amines, quaternary ammonium salts, chromium chloride, dialkyl zinc, trialkyl aluminum, mixtures thereof and the like. The reaction can suitably be conducted at a temperature of from about 75° C. to about 180° C., preferably from about 115° C. to about 140° C., for a time sufficient to complete the reaction.

The vinyl ester resins of the present invention can be cured by the usual methods described in the aforementioned patents relating to vinyl ester resins which were incorporated hereinbefore by reference.

The vinyl ester resins of the present invention are useful in the preparation of castings, coatings, laminates and the like.

The following non-limiting examples are illustrative of the present invention.

The following test methods were employed.
Viscosity—ASTM D 1475
HDT—ASTM D 648
Flexural Properties—D 790-71
Tensile Properties—D 638-72
Solvent Resistance—This test was conducted on 1"×3" (2.54 cm×19.35 cm) clear casting coupons. Solvent resistance was determined from the percent weight-gain observed after 24 hours (86400 s) in a room temperature solvent bath.

EXAMPLE 1

A. Preparation of Adduct of Maleic Anhydride and Dicyclopentadiene

A reaction vessel was equipped with a stirrer, a heating coil with a controller, a nitrogen sparge tube, and an ice-cooled funnel with an addition tube 1 to 1.5" (1.54 to 3.81 cm) below the surface of the solution. The following raw materials were employed.
98.0 g (1.0 eq.) maleic anhydride
16.2 g (0.9 eq.) deionized water
0.22 g (0.8 meq.) $CrCl_3.6H_2O$
105.6 g (0.8 eq.) dicyclopentadiene concentrate (DCPD)
17.4 g (0.3 eq.) propylene oxide
These materials were employed in the following manner. Add the maleic anhydride to the reactor. Set the temperature controller to 88° C. Establish a nitrogen atmosphere. After the maleic anhydride has melted and the temperature has reached 70° C., the first of four increments of $CrCl_3$ in water and DCPD were added. The $CrCl_3$ solution and the maleic anhydride were mixed well before adding the DCPD increment. The exotherm was controlled so as not to exceed 120° C. The controller was set to 100° C. for the subsequent additions. The procedure was repeated at 15 minute intervals. Ten minutes after the final addition, the temperature controller was set to 115° C. and reacted thereat for 1.25 hours (4500 s). The % COOH was ~18.5%. With the addition tube 1 to 1.5" (2.54 to 3.81 cm) below the surface of the solution, begin the 1.25 to 2.5 hour (4500 to 5400 s) addition of 0.3 mole propylene oxide. During the last 30 minutes (1800 s) the temperature was slowly increased to 140° C. The final percent acid was ≅15.0%.

B. Preparation of Vinyl Ester Resin

A reaction vessel was equipped with a stirrer and a heating coil with a controller. 163 g (0.9 eq.) diglycidyl ether of bisphenol A (DGEBA) having an average epoxide equivalent weight (EEW) of about 180 was added to 1.0 eq. of the product of Example 1-A at 120° C. The temperature of the reaction mass was returned to 120° C. and held there. When 3-4% COOH was attained, an additional quantity of 68.4 g (0.38 eq.) of DGEBA having an average EEW of about 180 was made to bring the % epoxide to 0.2–0.3% below the % COOH. At 1.2% COOH the resin was blended with 434.8 g styrene (45% of total charge) and 0.19 g phenothiazine stabilizing inhibitor.

EXAMPLE 2

A. Isomerization of Adduct Prepared in Example 1-A

A reaction vessel was equipped with a stirrer, a heating coil with a controller, a means of applying a vacuum and a Dean-Stark trap to collect water pulled off by vacuum. With the temperature at 140° C., 3.0 weight percent morpholine was charged to 309.7 g (1.0 eq.) of the product of Example A. A vacuum was applied to pull off any water present. The solution was reacted for 2 hours (7200 s) at which time the percent acid was 12.61, a drop of 1.9%. The trans isomer of maleic acid, evaluated by NMR, was 86% of the total available maleic.

B. Preparation of Vinyl Ester Resin

A reaction vessel was equipped with a stirrer and a heating coil with a controller. With 356.9 g (1.0 eq.) of the product of Example 2-A at 140°–142° C., 200 ppm hydroquinone and 180.0 g (1.0 eq.) DGEBA having an average EEW of about 180 were added. The exotherm which followed was allowed to rise to 160° C. After reacting to 0.8% COOH the resin was cooled to <125° C. and blended with 439.3 g of styrene.

EXAMPLE 3

A. Isomerization of Adduct Prepared In Example 1-A

A reaction vessel was equipped with a stirrer, a heating coil with a controller, a means of applying a vacuum, and a Dean-Stark trap for collecting water. With the temperature at 138°–140° C. and a vacuum applied to the open reaction vessel, 2 weight percent concentrated HCl was added to 305.3 g (1.0 eq.) of the product of Example 1-A. When the rapid boiling decreased, another 2% HCl was added. After the boiling ceased from the second HCl addition, the reactor was closed, the water vapor was pulled out and collected in the Dean-Stark trap. The vacuum was held until no water or water condensate was visible in the reaction flask. The solution was reacted for 1.5 hours (5400 s) from the second HCl addition to 16.7% COOH. Evaluation by NMR indicated 96% isomerization of maleic acid (anhydride).

B. Preparation of Vinyl Ester Resins

A reaction vessel was equipped with a stirrer and a heating coil with a controller. 268.8 g (1.0 eq.) of the product of Example 3-A was heated to 140° C. before 180.0 g (1.0 eq.) of DGEBA having an average EEW of about 180 and 225 ppm hydroquinone processing inhibitor were added. Ten minutes (600 s) after the addition an exotherm began. At 140° C. the heat was turned off and the temperature was allowed to rise to 157° C. The resin became clear. The heat of the reaction was maintained without an outside source of heat until 1.1% COOH was attained 35 minutes (2100 s) after the epoxy charge. When cooled to ~125° C. the resin was blended with 285.4 g styrene and 0.14 g phenothiazine stabilizing inhibitor.

EXAMPLE 4

A reaction vessel was equipped with a stirrer and a heating coil with a controller. 161.2 g (0.6 eq.) of the product of Example 3-A was heated to 100° C. before adding 180.0 g (1.0 eq.) DGEBA having an average EEW of about 180 and 200 ppm hydroquinone processing inhibitor. The exotherm was controlled to 152° C. At 3.0% COOH the temperature of the reaction mass was reduced to 110° C. and the temperature controller set. 43.0 g (0.5 eq.) glacial methacrylic acid was blended into the solution and 2,4,6-tri(dimethylaminomethyl)-phenol (DMP-30) (0.30 weight percent of the epoxy) was added. After reacting to 1.5% COOH, the temperature was reduced to 110° C. and 173.1 g styrene and 0.09 g phenothiazine stabilizing inhibitor were added to the resin.

EXAMPLE 5

A reaction vessel was equipped with a stirrer, a heating coil with a controller, and a nitrogen sparge. 136.4 g (0.75 eq.) of an epoxy novolac resin having an average functionality of about 3.6 and an average EEW of about 182 were treated with an ethyltriphenyl phosphonium acetate.acetic acid complex catalyst for one hour (3600 s) at 125° C. The temperature controller was set at 115° C. 1.0 eq. of the product of Example 3-A, 440 ppm hydroquinone processing inhibitor and 0.15 wt. percent, based on total grams epoxy, DMP-30 were added. After one-half hour (1800 s) 48.5 g (0.25 eq.) DGEBA having an average EEW of about 180 was added. At ~3% COOH, the temperature was reduced and 454.6 g styrene and 0.23 g phenothiazine stabilizing inhibitor were blended with the resin.

EXAMPLE 6

A reaction vessel was equipped with a stirrer and a heating coil with a controller. At 140° C., 185.3 g (1.0 eq.) DGEBA having an average EEW of about 185 and 200 ppm hydroquinone were added to 250.3 g (0.877 eq.) of a product similar to Example 3-A. The exotherm was controlled to 154° C. At 2.6% COOH, 12.1 g (0.123 eq.) maleic anhydride was added and reacted to ≅1.5% COOH. At 125° C., 366.3 g styrene and 0.18 g phenothiazine stabilizing inhibitor were blended with the resin.

EXAMPLE 7

A reaction vessel is equipped with a stirrer and a heating coil with a controller. To 283.4 g (1.0 eq.) of a product similar to Example 3-A, heated to 140° C., is added 320.0 g (1.0 eq.) of a diglycidyl ether of a polyoxypropylene glycol having an average molecular weight of about 400, said diglycidyl ether having an average EEW of about 320 and 200 ppm hydroquinone processing inhibitor. The reaction is continued at 140° C. until the % COOH is <1.2%. After cooling to <125° C., 493.7 g styrene and 0.25 g phenothiazine stabilizing inhibitor is added.

age EEW of 187 was then added to 381 g (1 eq) of the reaction mass. When 140° C. was reached the heat was turned off and the reaction mass was allowed to exotherm to 157° C. In 20 minutes (1200 s) the acid and epoxide were reduced to 1.7% and 1.6% respectively. The base solids were cooled to 125° C. before 238.0 g styrene was charged. At 80° C. 0.12 g phenothiazine stabilizing inhibitor was also added.

Each of the above prepared vinyl ester resins were cured with 1% by weight methyl ethyl ketone peroxide and 0.3% by weight cobalt naphthenate 6% at a temperature of about 155° C. for about 2 hours (7200 s).

The physical and solvent resistant properties are given in the following table.

TABLE

|  | Ex. 1 | Ex. 2 | Ex. 3 | Ex. 4 |
| --- | --- | --- | --- | --- |
| Tensile strength, psi/MPa | 7835/54 | 9240/64 | 5119/35 | 8330/57 |
| Tensile elongation, % | 1.58 | 2.08 | 0.87 | 1.95 |
| Flexural strength, psi/MPa | 13,513/93 | 18,912/130 | 15,596/107 | 18,499/127 |
| Modulus of Elasticity, psi/MPa | $5.02 \times 10^5/3458.78$ | $5.75 \times 10^5/3961.75$ | $5.92 \times 10^5/4078.88$ | $5.76 \times 10^5/3968.64$ |
| Heat distortion temperature, °F./°C. | <120/<48.8 | 208/97.7 | 215/101.7 | 219/103.9 |
| Viscosity, cs./(m²/s) | $1314/1314 \times 10^{-6}$ | $748/748 \times 10^{-6}$ | $286/286 \times 10^{-6}$ | $174/174 \times 10^{-6}$ |
| 24-hour solvent absorption (% weight gain) |  |  |  |  |
| toluene | 16.6 | 0.07 | 0.096 | 0.13 |
| deionized water | 0.08 | 0.14 | 0.14 | 0.22 |
| acetone | 19.3 | 5.18 | 5.49 | 4.78 |
| methanol | — | 0.63 | 0.49 | 0.99 |

|  |  | Ex. 5 | Ex. 6 | Ex. 8 |
| --- | --- | --- | --- | --- |
|  | Tensile strength, psi/MPa | 8804/61 | 7578/52 | 7727/53.24 |
|  | Tensile elongation, % | 1.73 | 1.68 |  |
|  | Flexural strength, psi/MPa | 16,702/115 | 16,638/115 | 16,441/113.28 |
|  | Modulus of Elasticity, psi/MPa | $5.29 \times 10^5/3644.81$ | $5.87 \times 10^5/4044.43$ | $6.2 \times 10^5/4271.8$ |
|  | Heat distortion temperature, °F./°C. | 206/96.7 | 214/101.1 | 204/95.6 |
|  | Viscosity, cs./(m²/s) | $1292/1292 \times 10^{-6}$ | $952/952 \times 10^{-6}$ | $211/211 \times 10^{-6}$ |
|  | 24-hour solvent absorption (% weight gain) |  |  |  |
|  | toluene | 0.11 | 0.10 | 2.4 |
|  | deionized water | 0.17 | 0.23 | 0.2 |
|  | acetone | 6.12 | 9.68 | 13.0 |
|  | methanol | 0.39 | 0.78 | 0.8 |

EXAMPLE 8

A reaction vessel was equipped with a stirrer, a heating coil with a controller, addition funnels, a Dean-Stark trap, a cold water condenser, a means of applying a vacuum and a means of applying a nitrogen pad. The temperature controller was set to 100° C. after charging 98.0 g (1.0 mole) maleic anhydride. At 70° C. with a nitrogen pad, 16.2 g (0.9 mole) deionized water, 154.4 g (0.8 mole) DCPD oligimer and 0.15 g (490 ppm) CrCl₃ catalyst were introduced into the reactor incrementally over the period of an hour (3600 s). The exotherms were controlled to ≦120° C. Following the addition of the final increment the temperature was increased to 115° C. and held there for 1.25 hours (4500 s). During the next 1.25 hours (4500 s) 17.4 g (0.3 mole) propylene oxide was added and the temperature slowly raised to 140° C. The half ester was isomerized by charging 7.5 g concentrated HCl and reacting for another 1.25 hours (4500 s). The water vapor was removed by applying a vacuum. 95.2 g (0.51 moles) DGEBA having an aver-

We claim:
1. A vinyl ester resin obtained by reacting
(A) at least one epoxy resin having an average of more than one glycidyl ether group per molecule; and
(B) a product resulting from a reaction of
  (1) the reaction product of
    (a) at least one α,β-ethylenically unsaturated acid containing 4 or 5 carbon atoms per molecule, anhydrides thereof, isomers thereof or mixtures thereof;
    (b) at least one unsaturated hydrocarbon selected from
      (i) dienes having from about 9 to about 12 carbon atoms;
      (ii) oligomers or cooligomers of dienes having from 4 to 6 carbon atoms optionally containing minor amounts of mono-olefins having from about 4 to about 6 carbon atoms; or

(iii) mixtures thereof; and
(c) if (B-1-a) contains an anhydride, from about 0.4 to about 3 moles of water per mole of anhydride; with
(2) a vicinal monoepoxide; and optionally
(3) up to about 10 percent by weight of the combined weight of (B-1) and (B-2) of a suitable isomerization catalyst for component (B-1-a); optionally
(C) up to about 0.75 mole per epoxy equivalent contained in components (A) of a polymerizable ethylenically unsaturated monocarboxylic acid; and optionally
(D) up to about 0.4 moles per epoxy equivalent contained in component (A) of maleic anhydride, citraconic anhydride or mixtures thereof; and
wherein components (A) and (B) are present in an amount which provides an epoxy equivalent to carboxyl equivalent ratio of from about 0.8:1 to about 2:1; components (B-2) and (B-1-a) are employed in an amount which provides from about 0.01 to about 0.6 moles of vicinal monoepoxide per mole of acid and/or anhydride; and component (B-1-b) is employed in an amount which provides from about 0.4 to about 1.5 moles per mole of component (B-1-a).

2. A vinyl ester resin of claim 1 wherein component (B-1-c), if component (B-1-a) contains an anhydride, is employed in a quantity of from about 0.8 to about 1.1 moles per mole of anhydride; components (A) and (B) are present in an amount which provides an epoxy equivalent to carboxyl equivalent ratio of from about 0.95:1 to about 1.05:1; components (B-2) and (B-1-a) are employed in an amount which provides from about 0.1 to about 0.5 moles of vicinal monoepoxide per mole of acid and/or anhydride; component (B-1-b) is employed in an amount which provides from about 0.7 to about 1.5 moles per mole of component (B-1-a); and Component (B-3) is present in an amount of from about 0.5 to about 7 percent by weight of the combined weight of components (B-1) and (B-2).

3. A vinyl ester resin of claim 2 wherein component A is a diglycidyl ether of a bisphenol or a polyglycidyl ether of a phenol-formaldehyde resin or mixture thereof.

4. A vinyl ester resin of claim 3 wherein component (B-2) is propylene oxide.

5. A vinyl ester resin of claims 1, 2, 3 or 4 wherein component (B) has been at least partially isomerized and component (B-1-b) is dicyclopentadiene or a composition comprising
(1) from about 70% to about 94% by weight of dicyclopentadiene;
(2) from about 6% to about 30% by weight of dimers and codimers of $C_4$–$C_6$ hydrocarbons;
(3) from about 0% to about 7% by weight of $C_{14}$ to $C_{18}$ trimers of $C_4$ to $C_6$ hydrocarbons; and
(4) from about 0% to about 7% by weight of other aliphatic hydrocarbons.

6. A vinyl ester resin of claims 1, 2, 3 or 4 wherein component (C) is not present.

7. A vinyl ester resin of claim 5 wherein component (C) is not present.

8. A vinyl ester resin of claims 1, 2, 3 or 4 wherein component (D) is not present.

9. A vinyl ester resin of claim 5 wherein component (D) is not present.

10. A vinyl ester resin of claims 1, 2, 3 or 4 wherein components (C) and (D) are not present.

11. A vinyl ester resin of claim 5 wherein components (C) and (D) are not present.

12. A thermosettable composition which comprises
(I) from about 25 to about 90 weight percent of one or more vinyl ester resins or mixture thereof with one or more unsaturated polyester resins wherein at least about 25 weight percent thereof is a vinyl ester resin which has been prepared by reacting
(A) at least one epoxy resin having an average of more than one glycidyl ether group per molecule; and
(B) a product resulting from a reaction of
(1) the reaction product of
(a) at least one $\alpha,\beta$-ethylenically unsaturated acid containing 4 or 5 carbon atoms per molecule, anhydrides thereof, isomers thereof or mixtures thereof;
(b) at least one unsaturated hydrocarbon selected from
(i) dienes having from about 9 to about 12 carbon atoms;
(ii) oligomers or cooligomers of dienes having from 4 to 6 carbon atoms optionally containing minor amounts of mono-olefins having from about 4 to about 6 carbon atoms; or
(iii) mixtures thereof; and
(c) if (B-1-a) contains an anhydride, from about 0.4 to about 3 moles of water per mole of anhydride; with
(2) a vicinal monoepoxide; and optionally
(3) up to about 10 percent by weight of the combined weight of (B-1) and (B-2) of a suitable isomerization catalyst for component (B-1-a); optionally
(C) up to about 0.75 mole per epoxy equivalent contained in components (A) of a polymerizable ethylenically unsaturated monocarboxylic acid; and optionally
(D) up to about 0.4 moles per epoxy equivalent contained in component (A) of maleic anhydride, citraconic anhydride or mixtures thereof; and
(II) from about 10 to about 75 percent by weight of at least one polymerizable ethylenically unsaturated monomer; and
wherein components (A) and (B) are present in an amount which provides an epoxy equivalent to carboxyl equivalent ratio of from about 0.8:1 to about 2:1; components (B-2) and (B-1-a) are employed in an amount which provides from about 0.01 to about 0.6 moles of vicinal monoepoxide per mole of acid and/or anhydride; and component (B-1-b) is employed in an amount which provides from about 0.4 to about 1.5 moles per mole of component (B-1-a).

13. A thermosettable composition of claim 12 wherein component I is present in an amount of from about 50 to about 65 weight percent; component II is present in an amount of from about 35 to about 50 percent by weight; component (B-1-c), if present, is employed in an amount of from about 0.8 to about 1.1 moles per mole of anhydride; component (I-A) and (I-B) are present in an amount which provides an epoxy equivalent to carboxyl equivalent ratio of from about 0.95:1 to about 1.05:1; components (I-B-2) and (I-B-1-a) are present in an amount which provides from about 0.1 to about 0.5 moles of monoepoxide per mole of acid and/or anhydride; component (I-B-1-b) is present in an amount which provides from about 0.7 to about 1.1 moles per mole of component (B-1-a); and component (I-B-3) is present in an amount of from about 0.5 to about 7 percent by weight of the combined weight of components (I-B-1) to (I-B-2).

14. A thermosettable composition of claim 13 wherein component (I-A) is a diglycidyl ether of a bisphenol or a polyglycidyl ether of a phenol-formaldehyde novolac resin or mixture thereof.

15. A thermosettable composition of claim 14 wherein component (I-B-2) is propylene oxide.

16. A thermosettable vinyl ester resin of claims 12, 13, 14 or 15 wherein component (I-B) has been at least partially isomerized and component (I-B-1-b) is dicyclopentadiene or a composition comprising
(1) from about 70% to about 94% by weight of dicyclopentadiene;
(2) from about 6% to about 30% by weight of dimers and codimers of $C_4$-$C_6$ hydrocarbons;
(3) from about 0% to about 7% by weight of $C_{14}$ to $C_{18}$ trimers of $C_4$ to $C_6$ hydrocarbons; and
(4) from about 0% to about 7% by weight of other aliphatic hydrocarbons.

17. A thermosettable composition of claims 12, 13, 14 or 15 wherein component (I-C) is not present.

18. A thermosettable composition of claim 16 wherein component (I-C) is not present.

19. A thermosettable composition of claims 12, 13, 14 or 15 wherein component (I-D) is not present.

20. A thermosettable composition of claim 16 wherein component (I-D) is not present.

21. A thermosettable composition of claims 12, 13, 14 or 15 wherein components (I-C) and (I-D) are not present.

22. A thermosettable composition of claim 16 wherein components (I-C) and (I-D) are not present.

23. A product resulting from curing a composition of claims 12, 13, 14 or 15 in the presence of a curing quantity of a curing system therefor.

24. A product resulting from curing a composition of claim 16 in the presence of a curing quantity of a curing system therefor.

25. A product resulting from curing a composition of claim 17 in the presence of a curing quantity of a curing system therefor.

26. A product resulting from curing a composition of claim 18 in the presence of a curing quantity of a curing system therefor.

27. A product resulting from curing a composition of claim 19 in the presence of a curing quantity of a curing system therefor.

28. A product resulting from curing a composition of claim 20 in the presence of a curing quantity of a curing system therefor.

29. A product resulting from curing a composition of claim 21 in the presence of a curing quantity of a curing system therefor.

30. A product resulting from curing a composition of claim 22 in the presence of a curing quantity of a curing system therefor.

* * * * *